(12) United States Patent
Wolff et al.

(10) Patent No.: US 8,827,354 B2
(45) Date of Patent: Sep. 9, 2014

(54) VEHICLE INTERIOR FITTING PART AND METHOD FOR THE PRODUCTION THEREOF

(75) Inventors: Martin Wolff, Hattingen (DE); Alexander Schidan, Solingen (DE); Thorsten Meyer, Krefeld (DE); Oliver Hube, Wolfenbuettel (DE); Holger Kalus, Duisburg (DE); Detlef Zimmermann, Kurten (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/577,620

(22) PCT Filed: Feb. 10, 2011

(86) PCT No.: PCT/EP2011/000622
§ 371 (c)(1),
(2), (4) Date: Nov. 21, 2012

(87) PCT Pub. No.: WO2011/107107
PCT Pub. Date: Sep. 9, 2011

(65) Prior Publication Data
US 2013/0057024 A1 Mar. 7, 2013

(30) Foreign Application Priority Data

Feb. 10, 2010 (DE) .......................... 10 2010 007 661

(51) Int. Cl.
*B60R 21/02* (2006.01)
*B60R 21/04* (2006.01)
*B60R 13/02* (2006.01)
*B60R 7/04* (2006.01)

(52) U.S. Cl.
CPC ............. *B60R 21/04* (2013.01); *B60R 13/0243* (2013.01); *B60R 21/0428* (2013.01); *B60R 2021/0421* (2013.01); *B60R 7/046* (2013.01)
USPC .................................... 296/187.05; 296/146.7

(58) Field of Classification Search
USPC ..................... 296/146.6, 146.7, 187.05, 39.1; 280/751, 752
See application file for complete search history.

(56) References Cited

U.S. PATENT DOCUMENTS 5,356,177 A * 10/1994 Weller .......................... 280/751
5,857,702 A * 1/1999 Suga et al. .................... 280/751

(Continued)

FOREIGN PATENT DOCUMENTS

| DE | 102004034124 A1 | 2/2006 |
| DE | 102007017090 A1 | 5/2008 |
| EP | 0863056 A1 | 9/1998 |
| JP | 2001-80432 * | 3/2001 |

OTHER PUBLICATIONS

International Search Report for application No. PCT/EP2011/000622 mailed Jul. 11, 2011.
International Preliminary Report on Patentability mailed Aug. 14, 2012.

*Primary Examiner* — Dennis H Pedder
(74) *Attorney, Agent, or Firm* — Fletcher Yoder, P.C.

(57) ABSTRACT

The invention relates to a vehicle interior fitting part, in particular for a motor vehicle, and to a method for producing a vehicle interior fitting part. The vehicle interior fitting part has a first support element and an energy absorption element. The support element is integrally joined to the energy absorption element by means of a connecting region. The support element is provided such that it can be pre-assembled relative to the energy absorption element by means of the connecting region.

9 Claims, 4 Drawing Sheets

(56) References Cited

U.S. PATENT DOCUMENTS

| | | | |
|---|---|---|---|
| 8,011,717 B2 * | 9/2011 | Endo et al. | 296/187.05 |
| 8,360,495 B2 * | 1/2013 | Simeonidis et al. | 296/39.1 |
| 2007/0046064 A1 * | 3/2007 | Winborn | 296/146.7 |
| 2009/0256391 A1 | 10/2009 | Hall et al. | |

* cited by examiner

VEHICLE INTERIOR FITTING PART AND METHOD FOR THE PRODUCTION THEREOF

CROSS REFERENCE TO RELATED APPLICATIONS

This application claims priority from and the benefit of PCT Application No. PCT/EP2011/000622, filed on Feb. 10, 2011 and German Patent No. DE 10 2010 007 661.9, filed on Feb. 10, 2010; which are herein incorporated by reference.

BACKGROUND

The present invention relates to a vehicle interior fitting part comprising a support element and an energy absorption element and a method for the production thereof.

Such vehicle interior fitting parts are generally known, in particular for the cladding of vehicle interiors. For example, a reinforcement part for impact protection of a side region of a motor vehicle is disclosed in the German published patent application DE 10 2004 034 124 A1, wherein the reinforcement part comprises a frame consisting of webs connected together. In this case, the webs are made from plastics material and are of honeycomb design. A drawback in the prior art is that when producing the honeycomb structure together with the vehicle interior fitting part it is not possible to prevent the honeycomb structure from being visible at least by way of indication on the front face (i.e. the side of the vehicle interior fitting part remote from the honeycomb structure). Moreover, said vehicle interior fitting part is very complex to produce, very heavy and relatively cost-intensive.

SUMMARY

It is an object of the present invention to produce a vehicle interior fitting part, in particular for a motor vehicle, which combines a high degree of safety in the event of an accident with the ability to be produced simply and cost-effectively and is also weight-saving and may be produced easily.

The object is achieved by a vehicle interior fitting part, in particular for a motor vehicle, comprising a support element and an absorption element, wherein the support element and the absorption element are made from the same material. As a result, according to the invention, it is possible in a particularly cost-effective manner to provide a component to fulfill a plurality of different functions, wherein preassembly is provided, in particular, for implementing said different functions, in order to install the vehicle interior fitting part in a motor vehicle and/or in a motor vehicle component.

The present invention relates to a vehicle interior fitting part, in particular the cladding of the bodywork of the vehicle and/or a dashboard. The vehicle interior fitting part is preferably a door lining. According to the invention, said vehicle interior fitting part comprises a support element which, for example, is connected to the bodywork, in particular to the basic door structure. An energy absorption element is arranged on said support element, said energy absorption element absorbing energy in the event of an accident and, as a result, minimizing the consequences of an accident for the vehicle occupant.

Preferably, the support element and the energy absorption element are shaped under pressure and/or at a temperature from a planar, in particular web-like or sheet-like material and then separated, for example cut out or stamped out.

Preferably, the support element and the energy absorption element are designed and/or arranged on the initial material such that the energy absorption element may be made from regions of the material web or material sheet which would otherwise accumulate as waste. As a result the material consumption is reduced.

According to a further subject according to the invention or preferred subject of the present invention, the energy absorption element is provided in one piece and extends over a plurality of planes. In particular, this refers to a plurality of planes between the vehicle occupant and the vehicle bodywork. As a result of the different planes, the energy absorption element is not deformed over its entire surface but the deformation takes place plane by plane.

Preferably, the energy absorption element comprises a plurality of indentations which are designed to be at least partially of different depths, i.e. preferably the size of the indentations between the vehicle occupant and the vehicle bodywork is variable. Preferably, the cross-sectional shape of the indentations differs.

Preferably, the energy absorption element comprises at least one, preferably two planes of symmetry, which are preferably located perpendicular to one another. The planes of symmetry preferably extend in the X and/or Z direction.

Preferably, the energy absorption element is arranged in a recess of the support element and particularly preferably connected positively to the support element.

Preferably, a decorative material is provided on the support element, wherein the decorative material is connected, in particular by a material connection, to the support material, particularly preferably when shaped. It is particularly preferred according to the invention if the support element has an integrally connected decorative material in a partial region of its surface. As a result, the decorative material may be applied to a partial region of the support element without a further connecting step.

Preferably, a storage compartment is located in the energy absorption element. Preferably, one of the indentations is provided as a storage compartment, which is particularly preferably covered by a cover.

A further subject of the present invention relates to a method for producing the vehicle interior fitting part according to the invention, wherein the support element and the energy absorption element are shaped in one method step. For example, both the support element and the energy absorption element are shaped from a material web or material sheet and/or the elements are stamped out simultaneously in one stamping process.

As a result, costs may be specifically saved during the production of the vehicle interior fitting part whilst a vehicle interior fitting part with a plurality of functions may be provided. Moreover, by creating said plurality of functions by means of a support element and an absorption element made from the same material and in the same production step, it is ensured that unnecessary logistical effort does not have to be expended, namely due to a plurality of parts numbers or the like, and costs may be reduced. According to the invention, for shaping the support element and the absorption element, in particular, a pressing process is provided in a pressing tool, wherein an initial material extended in a planar manner is deformed three-dimensionally and a stamping step is provided before, during or after the shaping step.

DRAWINGS

Exemplary embodiments of the invention are shown in the drawings and described in more detail in the following description. In the drawings.

DETAILED DESCRIPTION

Figure 1:
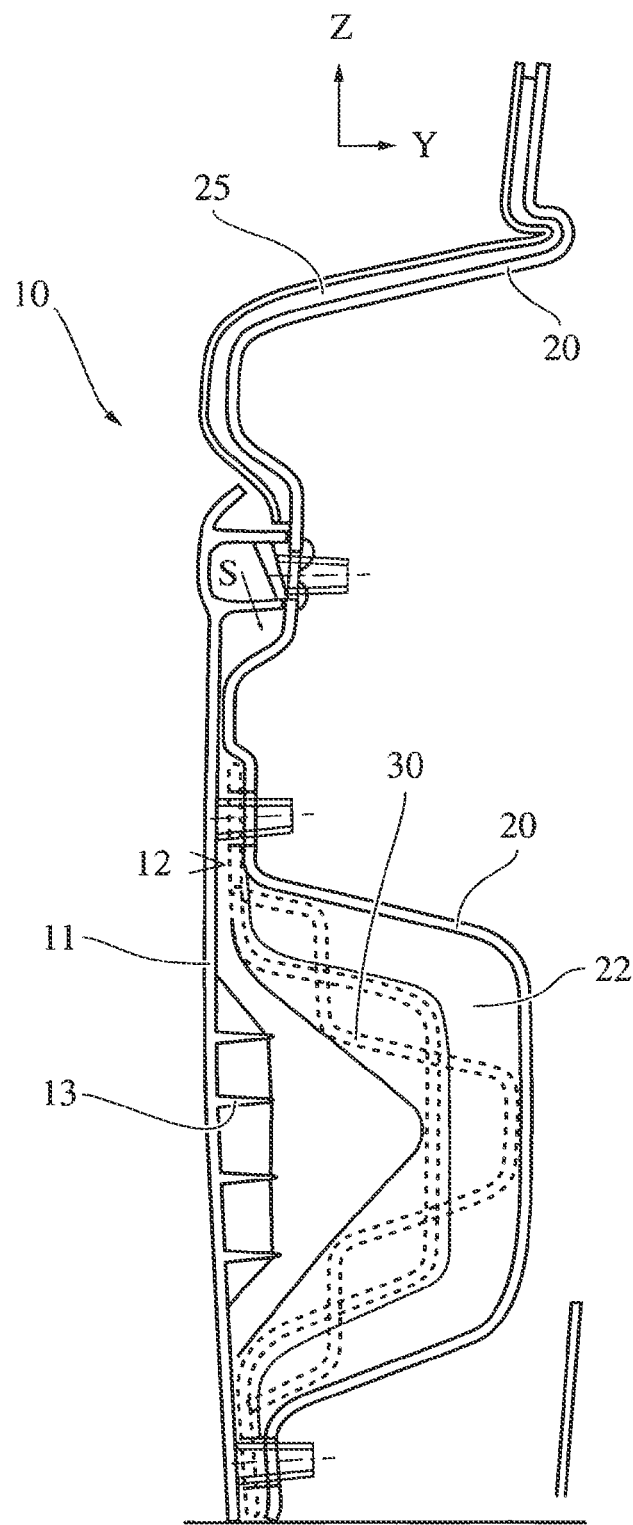
FIG. 1 shows a vehicle interior fitting part according to the invention comprising a support element and an absorption element in a sectional view along a cutting line.
Figure 2:
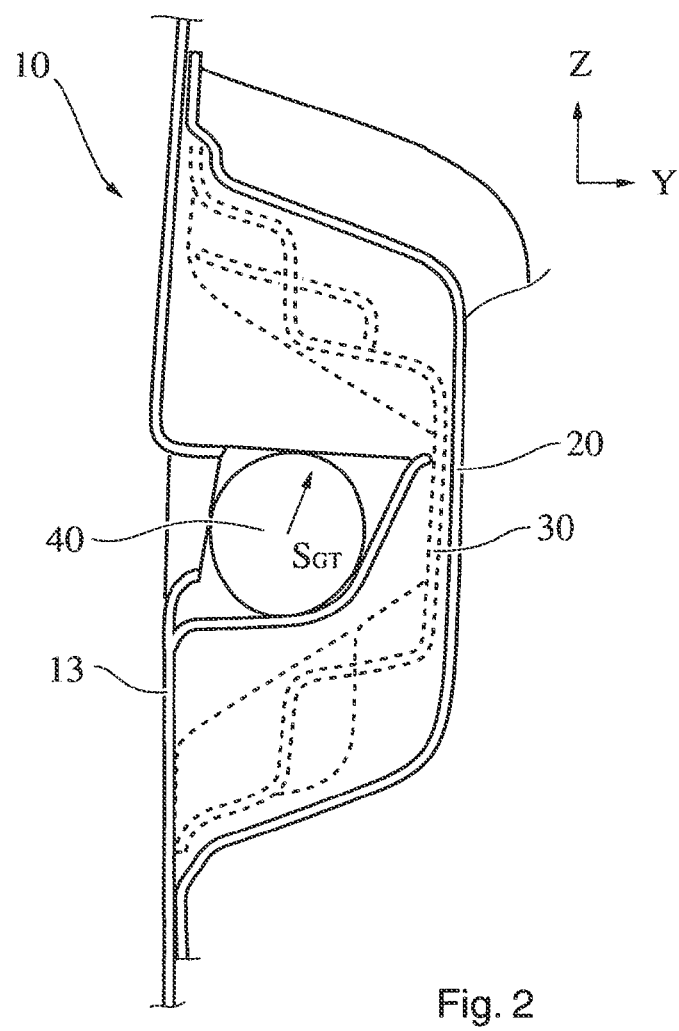
FIG. 2 shows a detail of the vehicle interior fitting part according to the invention in a sectional view along a further cutting line.
Figure 3:
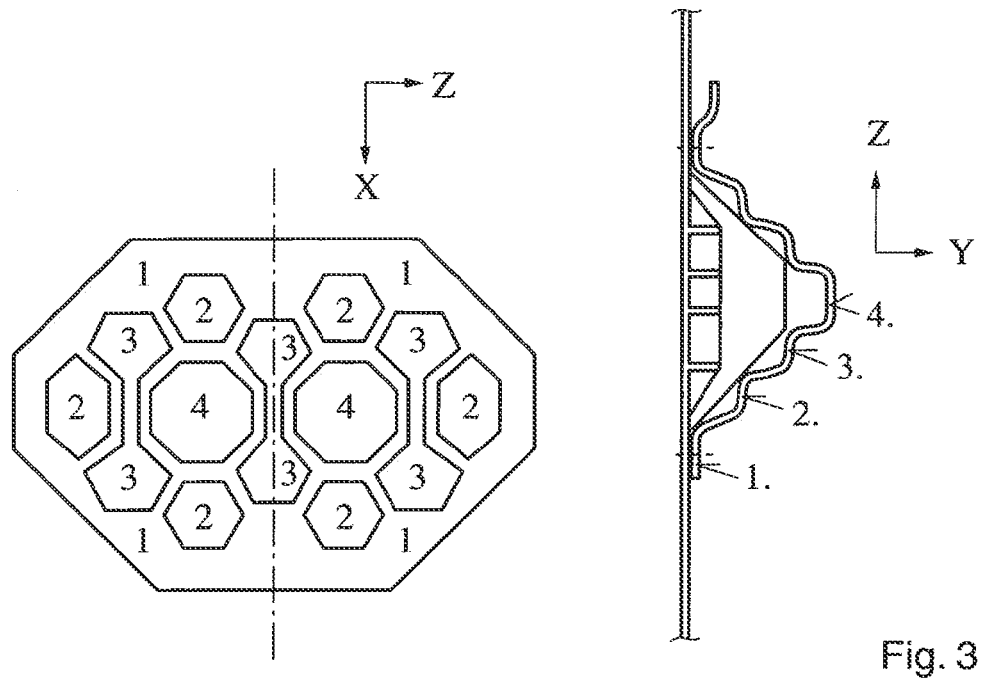
FIG. 3 shows the absorption element in a plan view and in a sectional view.

In FIGS. 1, 2 and 3 a vehicle interior fitting part 10 is shown in each case, said vehicle interior fitting part comprising a support element 20 and an absorption element 30. In the example shown, the vehicle interior fitting part 10 also comprises a covering and/or fastening element 11. The absorption element 30 serves for energy absorption in the event of an accident and thus for the protection of the vehicle occupants. In the exemplary embodiment shown, the support element 20 comprises a visible face in a partial region and in this region a decorative material 25. Preferably, said decorative material 25 is integrally connected in the same method step (i.e. without a further connecting material, such as for example an adhesive or the like) to the material of the support element 20. The absorption element 30 according to the invention is preferably shaped with the support element 20 and also preferably produced from the same material, preferably from a so-called NF material, which is a mixture of a thermoplastic material and a fiber material, particularly preferably fibers of natural origin. In particular, the NF material is a material comprising polypropylene and fiber material, wherein the polypropylene component is, for example, 50%. For example, renewable natural fiber material, such as kenaf, flax, hemp or the like, is considered as fiber material.

Preferably, the absorption element 30 is positioned in a recess 22 of the support element 20 and subsequently connected thereto by means of the covering and/or fastening element 11. For example, the connection is carried out via fastening pins, which are inserted through the energy absorption element 30 and the support element 20 and particularly preferably latched thereto. The covering and/or fastening element 11 may additionally have a serrated structure 12, in order to facilitate or to improve the fastening of the support element 20 and the absorption element 30. Moreover, the covering and/or fastening element 11 may also have a reinforcement structure 13, namely in the region of the absorption element 30.

In FIG. 2, a detail of a vehicle interior fitting part 10 according to the invention is shown in a sectional view along a further cutting line, wherein the covering and/or fastening element 11, the support element 20 and the absorption element 30 are shown in turn. In the view according to FIG. 2, a reflective vest 40 (shown in a sectional view) is also illustrated as an example of an object which is accommodated in a storage compartment integrated in the vehicle interior fitting part. In the covering and/or fastening element 11 a corresponding, optionally coverable opening is provided in order to provide access to the storage compartment.

Figure 4:
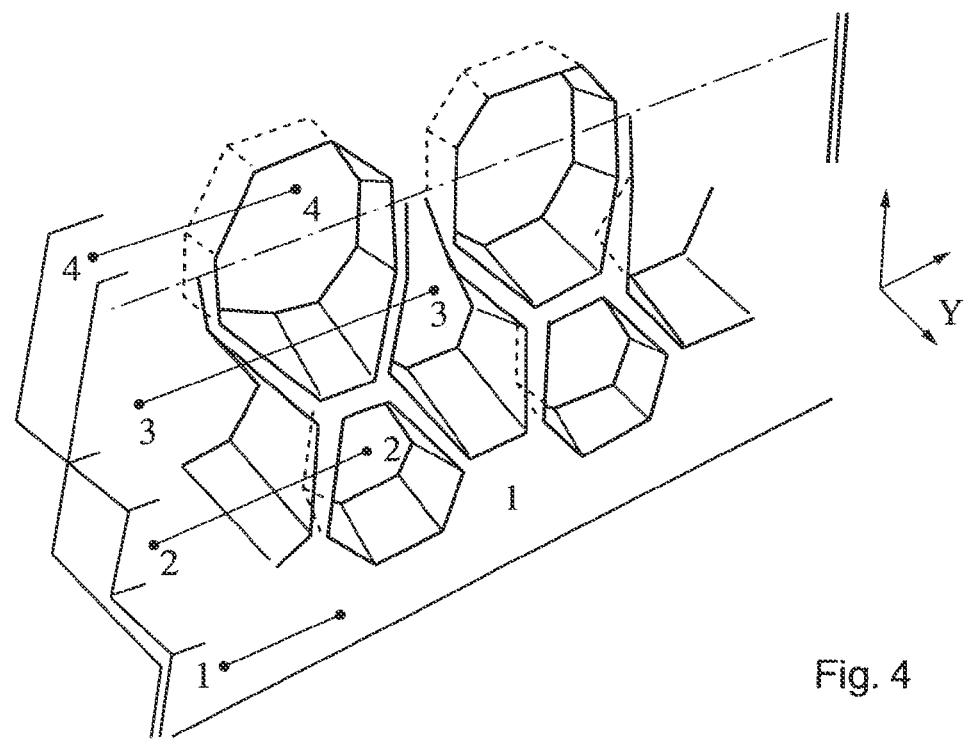
FIGS. 4 & 5 show the absorption element in each case in a perspective view.
Figure 5:
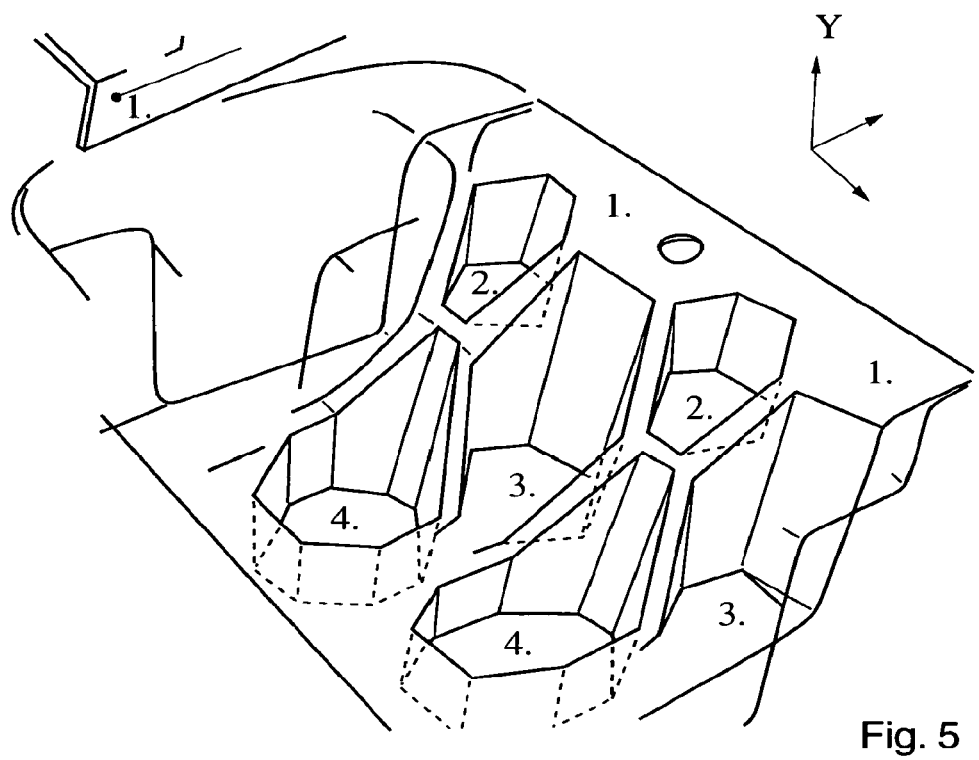

FIGS. 3 to 5 show different views of the absorption element 30. FIG. 3 shows the energy absorption element 30 in the left-hand part of the figure in a plan view and in the right-hand part of the figure in a sectional view. FIGS. 4 and 5 show the energy absorption element 30 in each case in a perspective view. From all views of FIGS. 3 to 5 it is clear that the energy absorption element 30 has different planes which are denoted by the reference numerals 1, 2, 3 and 4 and which extend from the vehicle occupant in the direction of the vehicle bodywork. It is clear from said drawings that, due to its deep-drawn and/or pressed shape, the energy absorption element 30 is able to absorb a large amount of deformation energy. The energy absorption element 30 comprises a plurality of indentations 1-4, which at least partially have a variable cross section. As may be derived from FIG. 3, in particular, the indentations 1-4 are arranged according to two planes of symmetry X, Z.

Figure 6:
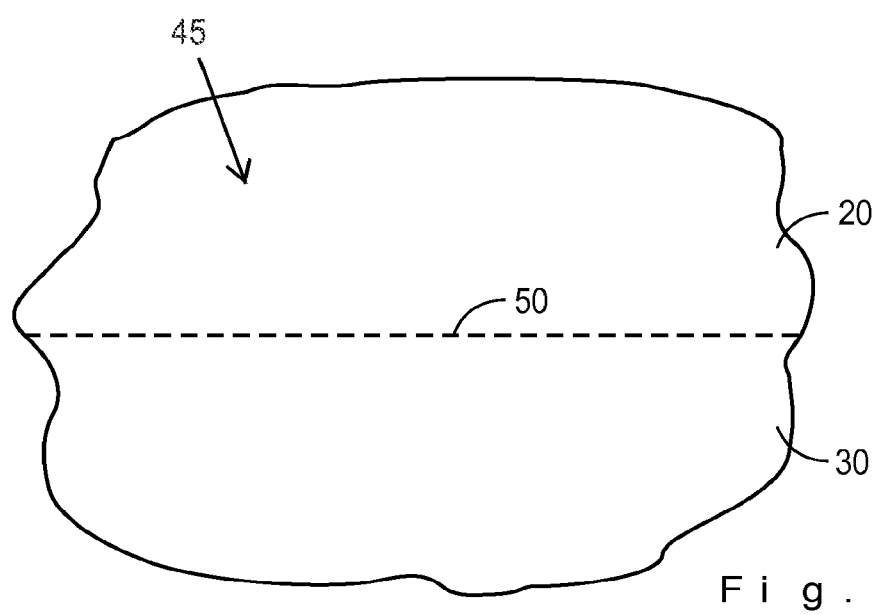
FIG. 6 is a top view of a single piece of planar material.

FIG. 6 is a top view of a single piece of planar material 45. The support element 20 and the energy absorption element 30 may be shaped under pressure and/or at a temperature from the single piece of planar material 45. For example, the single piece of planar material 45 may be a web-like or sheet-like material which is then separated, for example cut out or stamped out along a separation path 50.

The invention claimed is:

1. A vehicle interior fitting part comprising a support element and an energy absorption element, wherein the support element and the energy absorption element are formed from a single piece of planar material that is shaped to establish contours of the support element and the energy absorption element, and cut or stamped to separate the energy absorption element from the support element.

2. The vehicle interior fitting part as claimed in claim 1, wherein the energy absorption element is provided in one piece and extends over a plurality of planes.

3. The vehicle interior fitting part as claimed in claim 2, wherein the energy absorption element comprises a plurality of indentations at least partially of different depths.

4. The vehicle interior fitting part as claimed in claim 3, wherein the cross-sectional shape of the indentations differs.

5. The vehicle interior fitting part as claimed in claim 1, wherein the energy absorption element is located in a recess of the support element.

6. The vehicle interior fitting part as claimed in claim 1, wherein the energy absorption element is connected positively to the support element.

7. The vehicle interior fitting part as claimed in claim 1, comprising a decorative material on the support element.

8. The vehicle interior fitting part as claimed in claim 1, comprising a storage compartment located in the energy absorption element.

9. A method for producing the vehicle interior fitting part as claimed in claim 1, wherein the support element and the energy absorption element are shaped in one method step, and the support element and the energy absorption element are subsequently separated.

* * * * *